United States Patent Office 2,895,795
Patented July 21, 1959

2,895,795
METHOD FOR PRODUCING SODIUM CHLORIDE BRINE LOW IN CALCIUM SULFATE CONTENT

Horace W. Diamond, Chicago, Ill., assignor to Morton Salt Company, Chicago, Ill., a corporation of Illinois No Drawing. Application September 10, 1954
Serial No. 455,347

2 Claims. (Cl. 23—42)

This invention relates to an improved method for producing brine and more particularly to the production of sodium chloride brine having a low calcium content.

The production of sodium chloride and brine having a low calcium content, involves the treatment of the salt from which the brine is made, or of the treating water, with chemicals of one sort or another followed in most cases by filtration to remove precipitated calcium compounds and other undesirable materials. Though these methods are time-consuming and frequently expensive, they have in the past nevertheless been widely practiced because for certain uses, as in the production of chlorine, in the dyeing industry, in the production of soda ash and metallic sodium, it is very desirable that the brine have an extremely low calcium content.

In certain brine-making processes, as for example when purified brine is produced in accordance with the methods set forth in Comstock Patent U.S. No. 2,433,601 the resulting brine is super saturated with calcium sulfate. It is also noted that such brines also contain a substantial amount of sodium carbonate. The reason for this is that the sodium carbonate does not react with the calcium sulfate to precipitate calcium carbonate because of the presence of phosphates in the brine. It appears as though the phosphates complex the calcium in such a way that it is not precipitated by the carbonates as one would expect.

My invention is particularly applicable to the treatment of brines of high calcium super-saturation, such as result when brine is produced from impure salts which are treated with phosphates, as by the aforesaid Comstock procedure.

The method of this invention is based on my discovery that brine, particularly sodium chloride brine which contains calcium sulfate and which has been treated with phosphates, can be purified and the calcium content substantially reduced by treating the brine with calcium carbonate. It appears that the addition of calcium carbonate to the brine overcomes supersaturation of the calcium sulfate in the brine and as a result, equilibrium is obtained in the reaction which may be represented by the following equation:

$$\frac{Ca^+ \times CO_3^{--}}{CaCO_3} = K$$

By way of illustration, the following example will illustrate in detail the advantages and effectiveness of the present treatment.

Example 1

A number of sodium chloride brine samples were analyzed before and after being treated with various amounts of calcium carbonate. Samples of the same brine were thoroughly agitated with amounts of calcium carbonate indicated in the table below, for ½ hour to ¾ hour. The samples were then filtered and the brine analyzed; the results of the amounts of materials in the brine are given in grams per liter.

| | Brine No. $CaCO_3$ | Brine 1 g.p.l. $CaCO_3$ | Brine 10 g.p.l. $CaCO_3$ | Brine 50 g.p.l. $CaCO_3$ |
|---|---|---|---|---|
| $CaSO_4$ | 0.58 | 0.39 | 0.10 | 0.04 |
| $MgSO_4$ | 0.05 | 0.04 | 0.04 | 0.04 |
| $Na_2SO_4$ | 0.31 | 0.52 | 0.82 | 0.89 |
| $Na_2CO_3$ | 0.32 | 0.28 | 0.06 | 0.03 |
| $NaHCO_3$ | 0.13 | 0.13 | 0.15 | 0.17 |

From the above, it is seen that there is a sharp decrease in calcium content following the addition of calcium carbonate in the amounts shown followed by filtrations.

The brine-purifying process of this invention is applicable not only to brines produced in the conventional commercial salt dissolver type of operation using, for example, the wet storage salt dissolver (in which case the brine which is produced can be contacted with the calcium carbonate and then filtered to produce clear, sparkling brine, low in calcium content), but is also applicable to the treatment of brine which may be obtained from a brine well. In the latter situation, the calcium carbonate can be metered into the brine leaving the well in a predetermined amount, followed by filtration to remove solid materials.

While the above example illustrates certain preferred concentrations of calcium carbonate used, it is to be understood that these are illustrative only and not in any way to be construed as limiting the invention, and that modifications and variations in the nature and proportions of the ingredients may be made without departing from the scope of my invention.

The amount or ratio of calcium carbonate which can be used in accordance with my novel process is not critical. As seen above, one gram of calcium carbonate per liter of brine is effective in bringing about a significant reduction in calcium content of the brine and of course lesser amounts will also be effective though to a lesser extent.

I claim:

1. The method for reducing the calcium content of a sodium chloride brine containing in solution sodium carbonate, phosphates and calcium sulfate, which comprises adding calcium carbonate to said brine to effect a decrease in the dissolved calcium and carbonate content of the brine without a substantial decrease in the sulfate content of said brine, said decrease in the dissolved calcium and carbonate content of the brine resulting from precipitation of said calcium and carbonate content of said brine without corresponding calcium sulfate precipitation following addition of calcium carbonate to said brine, and then removing from the thus treated brine precipitated calcium carbonate together with the added calcium carbonate.

2. The method for producing a sodium chloride brine low in calcium content from a sodium chloride brine which contains in solution, sodium carbonate, phosphates, and calcium sulfate, which comprises adding calcium carbonate to said brine and removing from the mixture of brine and added calcium carbonate more calcium than was added in the form of calcium carbonate, without substantially changing thereby the sulfate content of the brine.

References Cited in the file of this patent
UNITED STATES PATENTS

| | | |
|---|---|---|
| 1,999,709 | Terzier | Apr. 30, 1935 |
| 2,191,411 | Pierce | Feb. 20, 1940 |
| 2,433,601 | Comstock | Dec. 30, 1947 |
| 2,516,988 | Hengerer | Aug. 1, 1950 |
| 2,683,649 | Hirsch | July 13, 1954 |